United States Patent Office 3,190,816
Patented June 22, 1965

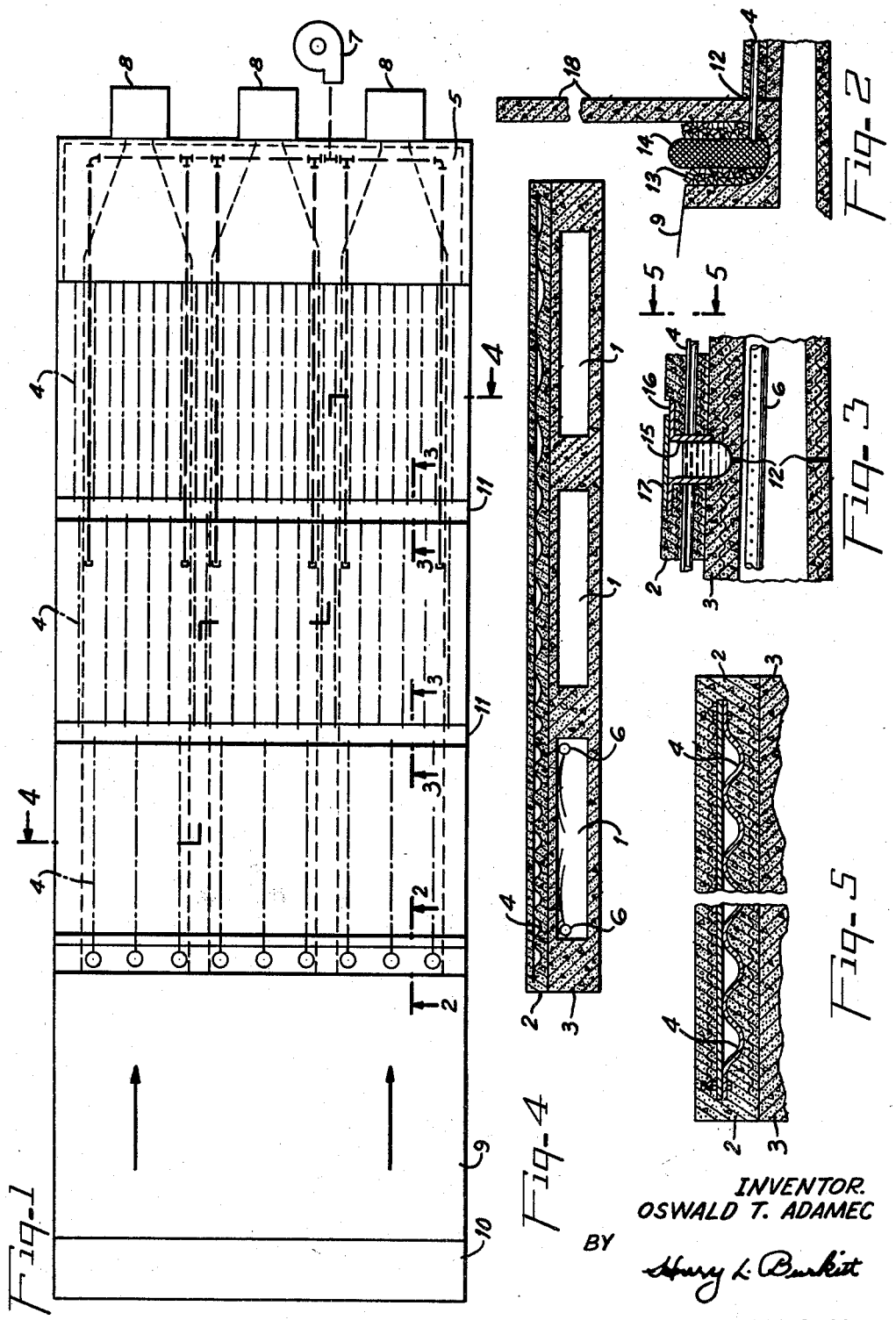

3,190,816
SOLAR DISTILLATION
Oswald T. Adamec, 23 Union Square E.,
Mount Vernon, N.Y.
Filed Dec. 16, 1958, Ser. No. 780,742
7 Claims. (Cl. 202—234)

This invention is a continuation-in-part of my application, Serial No. 757,595, filed August 27, 1958, which is now pending.

This invention relates to a process of distillation adapted for desalting sea water.

In this process, there is used, as one factor, a current of hot dry air passed through a spray of saline water, which has been heated by solar energy, as well as heat from other sources.

An object of the invention is to provide apparatus and a process utilizing such apparatus, to make it possible continuously to operate by increasing the efficiency and the thermal conductivity of the apparatus, so as to increase the rate of vaporization and condensation.

Another object of the invention is to provide a construction of the heat-absorbing-and-heating elements to assure substantial continuity of vaporization and condensation at a substantial rate.

For the attainment of these objects, and such other objects as will hereinafter appear or be pointed out, I have disclosed an illustrative embodiment of my invention in apparatus and a process, in the drawings, wherein FIG. 1 is a plan view of apparatus for effecting certain principles of the invention;

FIG. 2 is a detail vertical cross-sectional view, substantially on the line 2—2 of FIG. 1;

FIG. 3 is a vertical cross-sectional view, substantially on the line 3—3 of FIG. 1;

FIG. 4 is a vertical cross-sectional view, substantially on the line 4—4 of FIG. 1; and FIG. 5 is a transverse cross-sectional view, substantially on the line 5—5 of FIG. 3.

The structure discloses a concrete or asphalt slab or similar structure which may serve as the surface of an airway or runway. The top surface of this slab may be black, to assist as a heat absorbing area of solar energy. Below this surface, the slab provides a space to serve as a vaporization chamber. The composition of the surface material is variable in thickness to meet the particular requirements for the purposes to be served, being at least a few inches thick.

In the construction of the slab, lamp black, semi-plastic asphalt, concrete, a densifier, wire mesh and heat exchangers may be used in the proper proportions. Other substances such as de-oiled industrial metal filings, or ground Carborundum, may be added in the desired proportions for increasing thermal conductivity or wear.

The heating and vaporization chamber 1 (FIG. 4) has vertical concrete supports between upper heating slab 2 and lower structural slab 3, the vertical support not being shown owing to many variations possible, according to the uses for which the upper slab may be applied, in addition to its function of solar heat absorption. In some associations, both the heating and structural slabs may rest directly on the earth so that supports would not be required.

Vaporization chamber 1 (FIG. 1) is designed to permit sea water, heated by its passage through either grooves formed or over cast iron corrugated troughs 4, in slab 2, to be drained into a sump pit 5. The grooves may be lined with sheets of non-rusting sheet metal.

From pit 5, this heated water, by means of a centrifugal pump 7, is picked up and sprayed through perforated or nozzle-equipped cast iron pipes 6 which may be approximately 30% as long as the chamber. A strong current of water and/or ionized air is blown through the mist created in the vaporization chamber by the spraying action. The air, regardless of relative humidity, is drawn in from outside of the system by blowers 8. This operation may be continuous in tropical or temperate climatic locations.

The semi-saturated stream of air passes to the vented condensing chamber 9 where it is condensed by cooling coils, fins and baffles, the cooling being effected by cool sea water circulating through or over the coils, fins and baffles. The resulting potable water is collected by a continuous non-rusting metal tray near the bottom of the condensing chamber. The trays of similar adjacent units are connected by a common conduit leading to a storage, aeration and chlorination reservoir. Unvaporized sea water is collected at the bottom of each vaporization chamber, and flows by gravity to a collecting basin under condensing chamber 9.

It may then be recirculated, either with or without the admixture of fresh sea water, by being pumped into reservoir 10 and then, by flowing by gravity over the metal roof of condensing chamber 9, it serves to cool the roof by direct heat transfer and evaporation before flowing into a crushed limestone trough 13, where strainer 14 is connected to conduits 4 in heating slab 2. Slab 2 is prevented from cracking by expansion joints 11 made up of a flexible perforated copper trough 15 supported by perforated continuous copper bearing steel angles 16 and covered over by an abrasive plate 17. Expansion may be permitted in the lower structural slab by flexible mastic joints 12. Concrete baffle 18 prevents sea water flowing over the condenser roof from flooding the heating slab.

Having described the construction and function of my invention and process, what I claim as new and useful and desire to secure by Letters Patent is:

1. A solar distiller of sea water comprising a first structural means with an extensive top area commercially utilizable by heavy vehicles and having the property of thermal absorption and conductivity of solar heat, a series of tubular metal conduits spaced in and embedded within said structural means beneath said top surface to receive the heat absorbed by the structural means and for transferring the heat to sea water flowing therethrough, a second structural means supporting said first structural means, a vaporization chamber in said second structural means for receiving and vaporizing heated water and having means for delivering moisture receptive air to move from an end area of the chamber through the chamber, means for delivering the sea water flowing through said conduits to said vaporization chamber substantially in said end area, means for spraying heated sea water into said chamber to evaporate a part thereof, condensation means separate from said first and second structural means and having cooling and condensing surfaces, said cooling surfaces conveying evaporating sea water to cool said condensing surfaces, means for delivering the moisture-laden air from said vaporization chamber for condensing the moisture therefrom and forming purified water.

2. A solar distiller of sea water as set forth in claim 1 wherein said tubular metal conduits are made of cast iron and have a flat upper wall and a semi-circular fluted bottom wall, and square reinforced mesh is embedded in said structural means and connected to said cast iron conduits, and a heavy reinforcing mesh is embedded in said structural means on the opposite side of the first mesh from the top surface and metal corrugated masonry ties extend laterally to said conduits interconnecting said reinforcing mesh for the strengthening of said structural means.

3. A solar distiller of sea water as set forth in claim 1 wherein said structural means are formed with concrete channels and said metal conduits comprise thin sheets of non-rusting sheet metal formed in said channels to surface said channels with metal.

4. In combination with a vaporization unit and condensation unit to form a purified water, structural means formed of a material having the property of high thermal absorption and high conductivity of solar heat, reinforcing means and conduit members embedded in said material to reinforce said structural means for supporting moving vehicles, said conduit means being in a heat transfer relation with said material to heat sea water flowing through the conduits for subsequent vaporization and condensation to form a purified water.

5. A solar distiller comprising a member having a substantially flat surface, the member being of a substantial load-supporting thickness and its top surface being exposed to solar rays and being capable of supporting moving loads, the member having a plurality of grooves providing passages at a short distance below the exposed surface, a plurality of chambers formed in the member separated from and below the grooves, spraying members disposed in said chambers, means for delivering water to be heated to the grooves, means for forcing the water heated by passage through the grooves through the spraying members, and means for causing air to move through the chambers past the water being sprayed to take up moisture from the spray.

6. A solar distiller comprising a member having a substantially flat surface, the member being of a substantial load-supporting thickness and its top surface being exposed to solar rays and being capable of supporting moving loads, said top surface having means for increasing its heat-absorbing capacity, the member having cavities extending substantially parallel to said surface and having means therein to define substantially parallel inclined ways, the cavities being disposed a short distance below the exposed surface, a plurality of chambers formed in the member separated from and below the cavities, spraying members disposed in said chambers, means for delivering water to be heated to the inclined ways, means for forcing the water heated by passage through the ways through the spraying members, and means for causing air to move through the chambers past the water being sprayed to take up moisture from the spray.

7. A solar distiller comprising a member having a substantially flat surface, the member being of a substantial load-supporting thickness and its top surface being exposed to solar rays and being capable of supporting moving loads, said top surface having means for increasing its heat-absorbing capacity, the member having cavities extending substantially parallel to said surface and having means therein to define substantially parallel inclined ways, the cavities being disposed a short distance below the exposed surface, a plurality of chambers formed in the member separated from and below the cavities, spraying members disposed in said chambers, means for delivering water to be heated to the inclined ways, means for forcing the water heated by passage through the ways through the spraying members, means for causing air to move through the chambers past the water being sprayed to take up moisture from the spray, and means for conducting the moisture-laden air from the chambers over a cooling means.

References Cited by the Examiner

UNITED STATES PATENTS

| | | | |
|---|---|---|---|
| 966,070 | 8/10 | Bailey | 126—271 |
| 1,544,130 | 6/25 | Christensen. | |
| 1,705,068 | 3/29 | Sadtler | 94—8 |
| 2,066,656 | 1/37 | Stromberg | 94—3 |
| 2,202,756 | 5/40 | Cline | 126—271 |
| 2,268,320 | 12/41 | Brandt | 126—270 X |
| 2,456,562 | 12/48 | Lindsay. | |
| 2,466,150 | 4/49 | Burt | 94—1 X |
| 2,902,028 | 9/59 | Manly | 9—59 |

FOREIGN PATENTS

| | | |
|---|---|---|
| 28,130 | 12/07 | Great Britain. |
| 760,517 | 10/56 | Great Britain. |
| 183,621 | 4/36 | Switzerland. |

NORMAN YUDKOFF, *Primary Examiner.*

ROBERT D. NEVIUS, GEORGE D. MITCHELL,
*Examiners.*